(12) United States Patent
Gilson et al.

(10) Patent No.: US 11,929,818 B2
(45) Date of Patent: Mar. 12, 2024

(54) WAVEGUIDE SYSTEM

(71) Applicant: RTX CORPORATION, Farmington, CT (US)

(72) Inventors: Jonathan Gilson, West Hartford, CT (US); Joseph V. Mantese, Ellington, CT (US); Coy Bruce Wood, Ellington, CT (US); Eric J. Heims, Avon, CT (US); Gurkan Gok, Milford, CT (US); Joseph Zacchio, Wethersfield, CT (US)

(73) Assignee: RTX CORPORATION, Farmington, CT (US)

( * ) Notice: Subject to any disclaimer, the term of this patent is extended or adjusted under 35 U.S.C. 154(b) by 217 days.

(21) Appl. No.: 17/497,612

(22) Filed: Oct. 8, 2021

(65) Prior Publication Data

US 2023/0112230 A1    Apr. 13, 2023

(51) Int. Cl.
*H04B 7/185* (2006.01)
*F02C 7/32* (2006.01)

(52) U.S. Cl.
CPC ........... *H04B 7/18506* (2013.01); *F02C 7/32* (2013.01)

(58) Field of Classification Search
CPC ..... F02C 7/36; F02C 7/04; F02C 7/32; H04B 1/02; H04B 7/18506; H04B 5/0037; H04B 1/38
See application file for complete search history.

(56) References Cited

U.S. PATENT DOCUMENTS

| | | | |
|---|---|---|---|
| 9,748,665 B2 | 8/2017 | Anderson et al. | |
| 9,893,431 B2 | 2/2018 | Jensen et al. | |
| 10,027,004 B2 | 7/2018 | Savage et al. | |
| 10,638,207 B2 | 4/2020 | Mantese et al. | |
| 10,862,186 B2 | 12/2020 | De Rijk et al. | |
| 2016/0254582 A1 | 9/2016 | Jensen | |
| 2017/0170571 A1 | 6/2017 | Ushihim et al. | |
| 2017/0214110 A1* | 7/2017 | Shepard | H01Q 13/06 |
| 2019/0356033 A1 | 11/2019 | Dogiamis et al. | |
| 2020/0395649 A1* | 12/2020 | Levy | H01P 3/122 |

FOREIGN PATENT DOCUMENTS

KR    101044959 B1    6/2011

OTHER PUBLICATIONS

Bousalah Fayza et al., "Design of Simple and Double Ridge Waveguide T-Coupler for Space Domain", Advances in Applied Sciences, vol. 4, No. 3, Jan. 2019, 10 pages.
European Search Report for Application No. 22200415.2-1205; dated Feb. 3, 2023, 10 pages.

* cited by examiner

*Primary Examiner* — Tuan H Nguyen
(74) *Attorney, Agent, or Firm* — CANTOR COLBURN LLP

(57) ABSTRACT

According to an aspect, a waveguide system includes a first node, a second node, and a double-ridge waveguide. The double-ridge waveguide includes a metallic shell surrounding a waveguide core that forms a communication and radio frequency power transmission path in an aerospace environment. The first node is configured to propagate at least one communication channel and a radio frequency power transmission through the waveguide core to the second node during operation of the waveguide system in the aerospace environment.

17 Claims, 5 Drawing Sheets

WAVEGUIDE SYSTEM

BACKGROUND

This disclosure relates to electromagnetic communication, and more particularly to a waveguide system for transmitting communication and power in an aerospace environment.

As control and health monitoring systems become more complex, the interconnect count between system components increases, which also increases failure probabilities. With the increase in interconnects, large amounts of cabling may be used to connect sensors and actuators to controllers and/or diagnostic units of a machine. Long cable runs, including multiple wires, can add substantial weight and may increase susceptibility to noise effects and/or other forms of signal degradation. Increased wire connections can also result in a larger number of wire harnesses to remove and attach when servicing machine components. A larger number of wires and wire harnesses can increase the possibility of damage at pin/socket interconnects, particularly when the wire harnesses are attached and detached from components.

To achieve desired control and/or health monitoring, sensing systems may need information from locations that can be difficult to access due to moving parts, internal operating environment or machine configuration. The access limitations can make wire routing bulky, expensive, and potentially vulnerable to interconnect failures. Sensor and interconnect operating environments for desired sensor locations may exceed the capability of interconnect systems. In some cases, cable cost, volume, and weight may exceed desired limits for practical applications. Placement options and total number of sensors and actuators that may be installed in a machine can be limited by wiring and connector impacts on weight, reliability, physical sizing, and operating temperature limitations. Further, where power lines are routed in close proximity to communication lines, there can be a greater risk of crosstalk or noise transfer from the power lines to the communication lines. Such impacts may reduce signal-to-noise ratio and thereby reduce accuracy and/or reliability of data transmitted on the communication lines.

BRIEF DESCRIPTION

According to one embodiment, a waveguide system includes a first node, a second node, and a double-ridge waveguide. The double-ridge waveguide includes a metallic shell surrounding a waveguide core that forms a communication and radio frequency power transmission path in an aerospace environment. The first node is configured to propagate at least one communication channel and a radio frequency power transmission through the waveguide core to the second node during operation of the waveguide system in the aerospace environment.

In addition to one or more of the features described above or below, or as an alternative, further embodiments may include a plurality of nodes connected by two or more instances of the double-ridge waveguide.

In addition to one or more of the features described above or below, or as an alternative, further embodiments may include where the waveguide core is sized to propagate the at least one communication channel, and the radio frequency power transmission at a frequency range between 4 Gigahertz and 8 Gigahertz.

In addition to one or more of the features described above or below, or as an alternative, further embodiments may include where the metallic shell includes a plurality of ribbed supports distributed along an axis of transmission between a first transmission volume and a second transmission volume of the waveguide core.

In addition to one or more of the features described above or below, or as an alternative, further embodiments may include where a metallization thickness of the metallic shell is equal to or greater than a skin depth to confine electromagnetic radiation within a structure formed by the double-ridge waveguide.

In addition to one or more of the features described above or below, or as an alternative, further embodiments may include where the waveguide core includes a polymer material through which the at least one communication channel and the radio frequency power transmission are propagated.

In addition to one or more of the features described above or below, or as an alternative, further embodiments may include a polymer intensifier having a different dielectric property than the polymer material, where the polymer intensifier is formed between a first transmission volume and a second transmission volume of the waveguide core.

According to an embodiment, a system for a gas turbine engine includes a first node of the gas turbine engine, a second node of the gas turbine engine, and double-ridge waveguide. The second node is configured to interface with at least one sensor or at least one actuator of the gas turbine engine. The double-ridge waveguide includes a metallic shell surrounding a waveguide core that forms a communication and radio frequency power transmission path, where the first node is configured to propagate at least one communication channel and a radio frequency power transmission through the waveguide core to the second node during operation of the gas turbine engine.

According to an embodiment, a double-ridge waveguide is provided with a metallic shell surrounding a waveguide core. The double-ridge waveguide is installed between two nodes to form a communication and radio frequency power transmission path in an aerospace environment. At least one communication channel and a radio frequency power transmission propagate through the waveguide core between the two nodes during operation of a system in the aerospace environment.

A technical effect of the apparatus, systems and methods is achieved by a waveguide system as described herein.

BRIEF DESCRIPTION OF THE DRAWINGS

The following descriptions should not be considered limiting in any way. With reference to the accompanying drawings, like elements are numbered alike.

DETAILED DESCRIPTION

A detailed description of one or more embodiments of the disclosed apparatus and method are presented herein by way of exemplification and not limitation with reference to the Figures.

Figure 1:
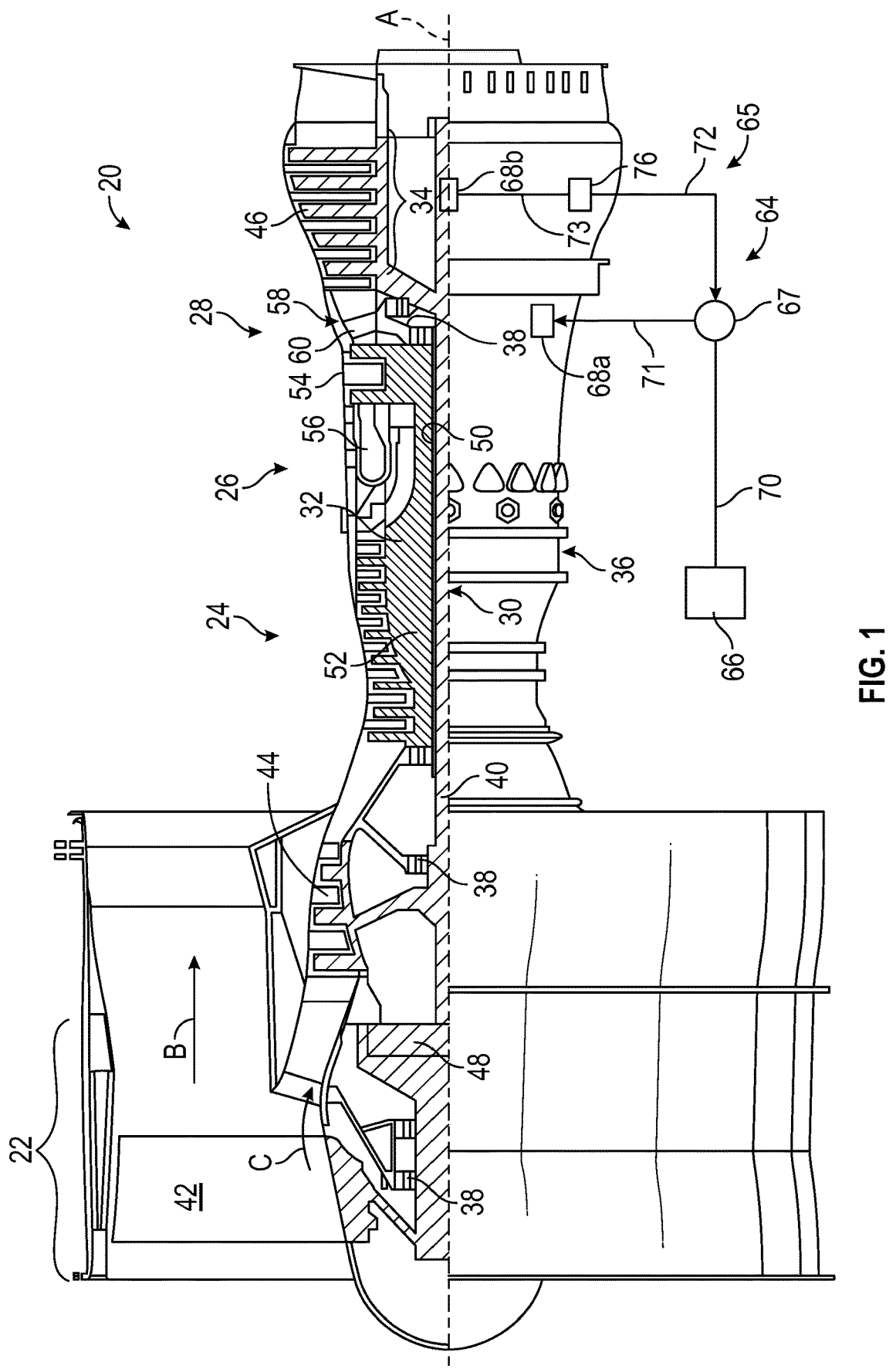
FIG. 1 is a cross-sectional view of a gas turbine engine as an example of a machine.

Various embodiments of the present disclosure are related to electromagnetic communication and power transfer through and to components of a machine in an aerospace environment. FIG. 1 schematically illustrates a gas turbine engine 20 as one example of a machine or system in an aerospace environment as further described herein. The gas turbine engine 20 is depicted as a two-spool turbofan that generally incorporates a fan section 22, a compressor section 24, a combustor section 26 and a turbine section 28. The fan section 22 drives air along a bypass flow path B in a bypass duct to provide a majority of the thrust, while the compressor section 24 drives air along a core flow path C for compression and communication into the combustor section 26 then expansion through the turbine section 28. Although depicted as a two-spool turbofan gas turbine engine in the disclosed non-limiting embodiment, it should be understood that the concepts described herein are not limited to use with two-spool turbofans as the teachings may be applied to other types of turbine engines including three-spool architectures or any other machine that requires sensors to operate with similar environmental challenges or constraints. Additionally, the concepts described herein may be applied to any machine or system comprised of control and/or health monitoring systems. Examples can include various moderate to high temperature environments, such as glass and metal forming systems, petroleum-oil-and-gas (POG) systems, ground-based turbine for energy generation, nuclear power systems, and transportation systems.

With continued reference to FIG. 1, the exemplary engine 20 generally includes a low speed spool 30 and a high speed spool 32 mounted for rotation about an engine central longitudinal axis A relative to an engine static structure 36 via several bearing systems 38. It should be understood that various bearing systems 38 at various locations may alternatively or additionally be provided, and the location of bearing systems 38 may be varied as appropriate to the application.

The low speed spool 30 generally includes an inner shaft 40 that interconnects a fan 42, a first (or low) pressure compressor 44 and a first (or low) pressure turbine 46. The inner shaft 40 is connected to the fan 42 through a speed change mechanism, which in exemplary gas turbine engine 20 is illustrated as a geared architecture 48 to drive the fan 42 at a lower speed than the low speed spool 30. The high speed spool 32 includes an outer shaft 50 that interconnects a second (or high) pressure compressor 52 and a second (or high) pressure turbine 54. A combustor 56 is arranged in exemplary gas turbine engine 20 between the high pressure compressor 52 and the high pressure turbine 54. A mid-turbine frame 58 of the engine static structure 36 is arranged generally between the high pressure turbine 54 and the low pressure turbine 46. The mid-turbine frame 58 further supports bearing systems 38 in the turbine section 28. The inner shaft 40 and the outer shaft 50 are concentric and rotate via bearing systems 38 about the engine central longitudinal axis A which is collinear with their longitudinal axes.

The core airflow is compressed by the low pressure compressor 44 then the high pressure compressor 52, mixed and burned with fuel in the combustor 56, then expanded over the high pressure turbine 54 and low pressure turbine 46. The mid-turbine frame 58 includes airfoils 60 which are in the core airflow path C. The turbines 46, 54 rotationally drive the respective low speed spool 30 and high speed spool 32 in response to the expansion. It will be appreciated that each of the positions of the fan section 22, compressor section 24, combustor section 26, turbine section 28, and fan drive gear system 48 may be varied. For example, gear system 48 may be located aft of combustor section 26 or even aft of turbine section 28, and fan section 22 may be positioned forward or aft of the location of gear system 48. In direct drive configurations, the gear system 48 can be omitted.

The engine 20 in one example is a high-bypass geared aircraft engine. Low pressure turbine 46 pressure ratio is pressure measured prior to inlet of low pressure turbine 46 as related to the pressure at the outlet of the low pressure turbine 46 prior to an exhaust nozzle. A significant amount of thrust can be provided by the bypass flow B due to the high bypass ratio. The example low pressure turbine 46 can provide the driving power to rotate the fan section 22 and therefore the relationship between the number of turbine rotors 34 in the low pressure turbine 46 and the number of blades in the fan section 22 can establish increased power transfer efficiency.

The disclosed example gas turbine engine 20 includes a control and health monitoring system 64 (generally referred to as system 64) utilized to monitor component performance and function. The system 64 includes a network 65, which is an example of a guided electromagnetic transmission network. The network 65 includes a controller 66 operable to communicate with nodes 68a, 68b through electromagnetic signals. The controller 66 may include various support interfaces and processing resources, such as input/output interfaces, processing systems, memory systems, communication interfaces, power management systems, and the like. The nodes 68a, 68b can be distributed throughout the gas turbine engine 20 or other such machine. Node 68a is an example of an actuator node that can drive one or more actuators/effectors of the gas turbine engine 20. Node 68b is an example of a sensor node that can interface with one or more sensors of the gas turbine engine 20. Nodes 68a, 68b can include processing support circuitry to transmit/receive electromagnetic signals between sensors or actuators and the controller 66. A coupler 67 can be configured as a splitter between a waveguide 70 coupled to the controller 66 and waveguides 71 and 72 configured to establish wireless communication with nodes 68a and 68b respectively. The coupler 67 can be a simple splitter or may include a repeater function to condition electromagnetic signals sent between the controller 66 and nodes 68a, 68b. In the example of FIG. 1, a radio frequency-based repeater 76 is interposed between the coupler 67 and node 68b, where waveguide 72 is a first waveguide coupled to the coupler 67 and radio frequency-based repeater 76, and waveguide 73 is a second waveguide coupled to the radio frequency-based repeater 76 and node 68b. Collectively, waveguides 70, 71, 72, 73 are configured to guide transmission of the radio frequencies (e.g., electromagnetic signals) between the controller 66 and one or more of the nodes 68a, 68b. The transmission media within waveguides 70-73 may include dielectric or gaseous material. In embodiments, the waveguides 70-73 can be hollow metal tubes. The waveguides 70-73 may be rigid or may include flexible material. The disclosed system 64 may be utilized to control and/or monitor any component function or characteristic of a turbomachine, aircraft component operation, and/or other machines.

Prior control and diagnostic system architectures utilized in various applications may include a centralized system architecture in which the processing functions reside in an electronic control module. Actuator and sensor communications were accomplished through analog wiring for power, command, position feedback, sensor excitation and sensor signals. Cables and connections include shielding to minimize effects caused by electromagnetic interference (EMI). The use of analog wiring and the required connections can limit application and capability of such systems due to the ability to locate wires, connectors and electronics in harsh environments that experience extremes in temperature, pressure, and/or vibration. Exemplary embodiments can use radio frequencies guided by the waveguides 70-73 in a wireless architecture to provide both electromagnetic communication signals and power to the individual elements of the network 65.

The use of electromagnetic radiation in the form of radio waves (MHz to GHz) to communicate and power the sensors and actuators using a traditionally complex wired system provides substantial architectural simplification, especially as it pertains to size, weight, and power (SWaP). Embodiments provide extension of a network where reduced signal-to-noise ratio (SNR) may compromise network performance by trading off data rates for an expansion of the number of nodes and distribution lines; thereby providing more nodes/sensors, with greater interconnectivity. Embodiments can operate in the C-band of electromagnetic frequencies that can span 4 GHz to 8 GHz, for example.

Figure 2:
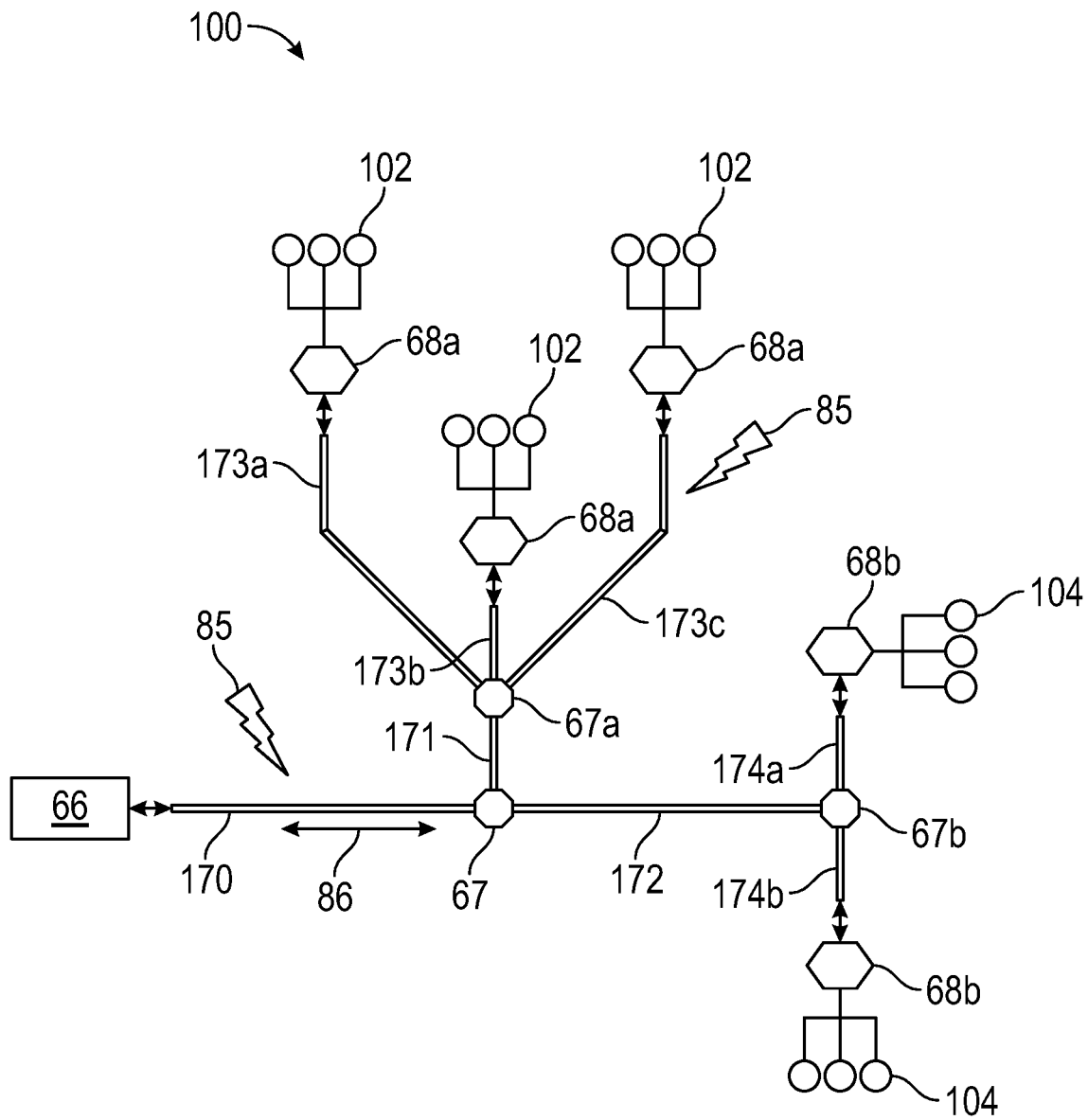
FIG. 2 is a schematic view of a guided electromagnetic transmission network in accordance with an embodiment of the disclosure.

Referring to FIG. 2, a guided electromagnetic transmission network 100 is depicted as an example expansion of the network 65 of FIG. 1. The guided electromagnetic transmission network 100 can include the controller 66 coupled to coupler 67 through waveguide 170. The coupler 67 is further coupled to coupler 67*a* through waveguide 171 and to coupler 67*b* through waveguide 172. Coupler 67*a* is further coupled to three nodes 68*a* through waveguides 173*a*, 173*b*, 173*c* in parallel. Each of the nodes 68*a* can interface or be combined with multiple actuators 102. Coupler 67*b* is also coupled to two nodes 68*b* through waveguides 174*a*, 174*b* in parallel. Each of the nodes 68*b* can interface or be combined with multiple sensors 104. Although the example of FIG. 2 depicts connections to actuators 102 and sensors 104 isolated to different branches, it will be understood that actuators 102 and sensors 104 can be interspersed with each other and need not be isolated on dedicated branches of the guided electromagnetic transmission network 100. Couplers 67, 67*a*, 67*b* can be splitters and/or can incorporate instances of the radio frequency-based repeater 76 of FIG. 1. Further, one or more instances of the radio frequency-based repeater 76 can be installed at any of the waveguides 170, 171, 172, 173*a-c*, and/or 174*a-b* depending on the signal requirements of the guided electromagnetic transmission network 100.

Nodes 68*a*, 68*b* can be associated with particular engine components, actuators or any other machine part from which information and communication is performed for monitoring and/or control purposes. The nodes 68*a*, 68*b* may contain a single or multiple electronic circuits or sensors configured to communicate over the guided electromagnetic transmission network 100.

The controller 66 can send and receive power and data to and from the nodes 68*a*, 68*b*. The controller 66 may be located on equipment near other system components or located remotely as desired to meet application requirements.

A transmission path (TP) between the controller 66 and nodes 68*a*, 68*b* can be used to send and receive data routed through the controller 66 from a control module or other components. The TP may utilize electromagnetic communication including radio frequency/microwave electromagnetic energy transferred through waveguides. The interface between the controller 66 and nodes 68*a*, 68*b* can transmit power and signals.

The example nodes 68*a*, 68*b* may include radio-frequency identification devices along with processing, memory and/or the interfaces to connect to conventional sensors or actuators, such as solenoids or electro-hydraulic servo valves. The waveguides 170, 171, 172, 173*a-c*, and/or 174*a-b* can be shielded paths that support electromagnetic communication, including, for instance, radio frequency, microwaves, magnetic or optic waveguide transmission. Shielding can be provided such that electromagnetic energy or light interference 85 with electromagnetic signals 86 (shown schematically as arrows) are mitigated in the guided electromagnetic transmission network 100. Moreover, the shielding provides that the electromagnetic signals 86 are less likely to propagate into the environment outside the guided electromagnetic transmission network 100 and provide unauthorized access to information. In some embodiments, guided electromagnetic radiation is in the range 1-100 GHz. Electromagnetic radiation can be more tightly arranged around specific carrier frequencies, such as 3-4.5 GHz, 24 GHz, 60 GHz, or 76-77 GHz as examples in the microwave spectrum. One or more carrier frequencies can transmit electric power, as well as communicate information, to multiple nodes 68*a*, 68*b* using various modulation and signaling techniques.

The nodes 68*a* with actuators 102 may include control devices, such as a solenoid, switch or other physical actuation devices. Radio frequency identification, electromagnetic or optical devices implemented as the nodes 68*b* with sensors 104 can provide information indicative of a physical parameter, such as pressure, temperature, speed, proximity, vibration, identification, and/or other parameters used for identifying, monitoring or controlling component operation. Signals communicated in the guided electromagnetic transmission network 100 may employ techniques such as checksums, hash algorithms, error control algorithms and/or encryption to mitigate cyber security threats and interference.

In some embodiments, shielding in the guided electromagnetic transmission network 100 can be provided such that power and communication signals are shielded from outside interference, which may be caused by environmental electromagnetic or optic interference. Moreover, the shielding limits intentional interference 85 with communication at each component. Intentional interference 85 may take the form of unauthorized data capture, data insertion, general disruption and/or any other action that degrades system communication. Environmental sources of interference 85 may originate from noise generated from proximate electrical systems in other components or machinery along with electrostatic and magnetic fields, and/or any broadcast signals from transmitters or receivers. Additionally, environmental phenomena, such as cosmic radio frequency radiation, lightning or other atmospheric effects, could interfere with local electromagnetic communications.

The system 64 provides for a reduction in cable and interconnecting systems to reduce cost and increases reliability by reducing the number of physical interconnections. Reductions in cable and connecting systems further provides for a reduction in weight while providing additional redundancy. Moreover, additional sensors can be added without the need for additional wiring and physical connections to the controller 66, which may provide for increased system accuracy and response. Embodiments can provide a "plug-n-play" approach to add a new node, potentially without a requalification of the entire system but only the new component; thereby greatly reducing qualification burdens.

Figure 3:
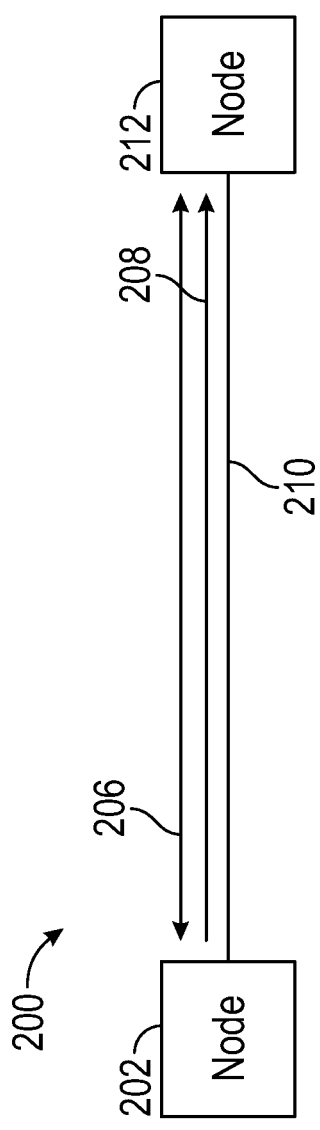
FIG. 3 is a schematic view of a waveguide system between nodes in accordance with an embodiment of the disclosure.

FIG. 3 is a schematic view of a waveguide system 200 in accordance with an embodiment of the disclosure. A first node 202 and a second node 212 are configured to establish a communication path to propagate at least one communication channel 206 and a radio frequency power transmission 208 through a waveguide 210 in a system, such as the gas turbine engine 20 of FIG. 1. The first node 202 can include processing system elements, input/output, and communication interfaces to interface with the second node 212. In the example of FIG. 3, the waveguide 210 can be an instance of the waveguides 70-73, 170, 171, 172, 173a-c, and/or 174a-b of FIGS. 1 and 2. The first node 202 can be an instance of the controller 66 of FIGS. 1 and 2, and the second node 212 can be an instance of node 68a, 68b of FIGS. 1 and 2, for example. The waveguide 210 can incorporate any combination of the design features as further described in reference to FIGS. 4-8. Thus, a plurality of nodes can be connected by two or more instances of the waveguide 210, such as double-ridge waveguides 300, 400, 500, 600, 700 having first and second ridges as further described herein.

Figure 4:
FIG. 4 is a schematic view of a waveguide in accordance with an embodiment of the disclosure.

FIG. 4 is a schematic view of a double-ridge waveguide 300 as one example of the waveguide 210 of FIG. 3 in accordance with an embodiment of the disclosure. The double-ridge waveguide 300 is an example that includes a metallic shell 302 surrounding a waveguide core 304 that forms a communication and radio frequency power transmission path in an aerospace environment. The waveguide core 304 in a cross-section of the double-ridge waveguide 300 can appear as an "H", where signals propagate through the interior portion of the waveguide core 304. Although the double-ridge waveguide 300 appears to have a consistent shape, the geometry of the double-ridge waveguide 300 can change externally and/or internally. For example, the double-ridge waveguide 300 may include bends and junctions to support a one-to-many node connection architecture. The double-ridge waveguide 300 can be installed between the first node 202 and the second node 212 of FIG. 3. The first node 202 can be configured to propagate at least one communication channel 206 and a radio frequency power transmission 208 through the waveguide core 304 to the second node 212 during operation of the system in the aerospace environment.

The geometry of the waveguide core 304 can be sized based on the transmission frequency wavelengths. The wavelength can be computed as the speed of light divided by the frequency. For example, when operating in the C-Band with a frequency range of 4 GHz to 8 GHz, the resulting wavelengths can be computed and used to size the interior dimensions of the waveguide core 304. The double-ridge shape can provide more efficient transmission than a non-ridged configuration, which may require a larger core width and/or height. Sizing of the waveguide core 304 can also be determined with respect to a frequency gap and power differential between the communication channel 206 and a radio frequency power transmission 208, such that transmission of both signals can be accommodated within the waveguide core 304 as a multiplexed transmission. A metallization thickness (T1) of the metallic shell 302 surrounding a waveguide core 304 is equal to or greater than a skin depth to confine electromagnetic radiation within a structure formed by the double-ridge waveguide 300. In the example of FIG. 4, the metallization thickness (T1) may be greater to provide more structural rigidity, for example, when longer separation distances exist between nodes 202, 212 and/or harsher environmental conditions exist.

Figure 5:
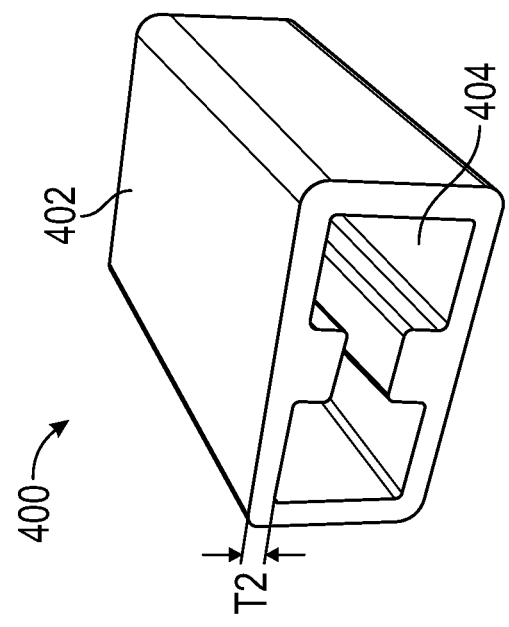
FIG. 5 is a schematic view of a waveguide in accordance with an embodiment of the disclosure.

In contrast, the double-ridge waveguide 400 of FIG. 5 can include a metallization thickness (T2) of a metallic shell 402 surrounding a waveguide core 404 that is thinner than the metallization thickness (T1) of double-ridge waveguide 300 of FIG. 4. In the example of FIG. 5, the waveguide core 404 may have substantially similar dimensions to the waveguide core 304 of FIG. 4. The reduced metallization thickness (T2) of metallic shell 402 as compared to the metallization thickness (T1) of double-ridge waveguide 300 may be used to reduce weight. Although the metallization thickness (T2) can be less than the metallization thickness (T1), the metallization thickness (T2) is equal to or greater than a skin depth to confine electromagnetic radiation within a structure formed by the double-ridge waveguide 400. To provide sufficient rigidity for the metallic shell 402, various metals and alloys can be used, such as titanium or aerospace aluminum alloy, for instance.

Figure 6:
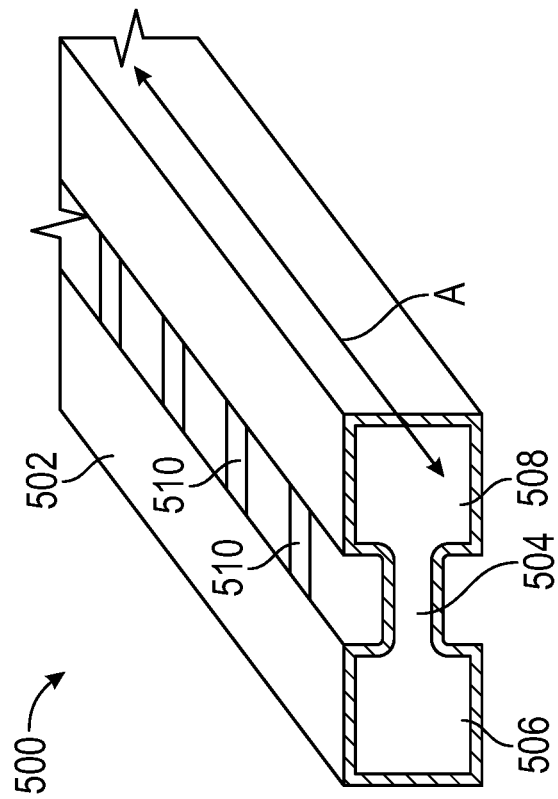
FIG. 6 is a schematic view of a waveguide with support ribs in accordance with an embodiment of the disclosure.

FIG. 6 is a schematic view of a double-ridge waveguide 500 in accordance with an embodiment of the disclosure. Similar to FIG. 5, the double-ridge waveguide 500 includes a metallic shell 502 surrounding a waveguide core 504 that forms a communication and radio frequency power transmission path in an aerospace environment. In order to provide additional structural support while using a reduced thickness of the metallic shell 502, the metallic shell 502 can include a plurality of ribbed supports 510 distributed along an axis of transmission (A) between a first transmission volume 506 and a second transmission volume 508 of the waveguide core 504. The ribbed supports 510 can be incorporated in various embodiments as disclosed herein to enhance the structural integrity of a double-ridge waveguide, such as the double-ridge waveguide 500.

Figure 7:
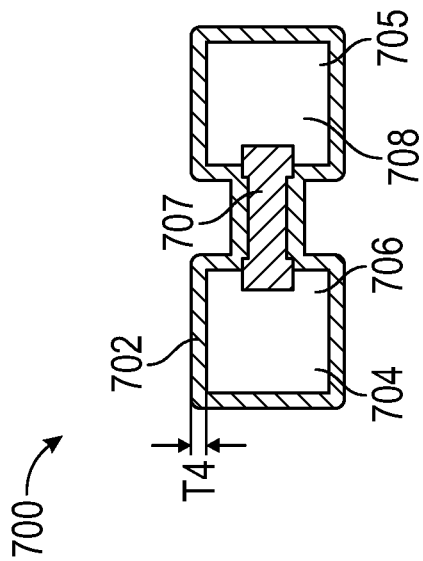
FIG. 7 is a schematic view of a waveguide with a polymer material in a waveguide core in accordance with an embodiment of the disclosure.

FIG. 7 is a schematic view of a double-ridge waveguide 600 in accordance with an embodiment of the disclosure. The double-ridge waveguide 600 includes a metallic shell 602 surrounding a waveguide core 604 that forms a communication and radio frequency power transmission path in an aerospace environment. The waveguide core 604 can be made of a polymer material 605 through which at least one communication channel 206 and radio frequency power transmission 208 of FIG. 3 can be propagated. The polymer material 605 can be a high-dielectric, low-loss polymer, such as polyethene, Teflon, polyimide, or other such materials. The use of the polymer material 605 can result in reducing a width and height of the waveguide core 604 inversely proportional to the square root of dielectric permittivity. A metallization thickness (T3) of the metallic shell 602 is equal to or greater than a skin depth to confine electromagnetic radiation within a structure formed by the double-ridge waveguide 600. The metallization thickness (T3) can be less than the metallization thickness (T2) of double-ridge waveguide 400 of FIG. 5, as the polymer material 605 can provide more structural support than the waveguide core 404 (e.g., where waveguide core 404 is hollow or contains a fluid).

Figure 8:
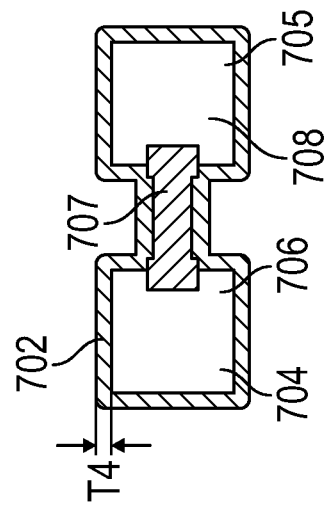
FIG. 8 is a schematic view of a waveguide with a polymer intensifier in accordance with an embodiment of the disclosure.

FIG. 8 is a schematic view of a double-ridge waveguide 700 in accordance with an embodiment of the disclosure. The double-ridge waveguide 700 includes a metallic shell 702 surrounding a waveguide core 704 that forms a communication and radio frequency power transmission path in an aerospace environment. The waveguide core 704 can be made of a polymer material 705 through which at least one communication channel 206 and radio frequency power transmission 208 of FIG. 3 can be propagated. The polymer material 705 can be the same as polymer material 605 of FIG. 7 or have a different composition. A metallization thickness (T4) of the metallic shell 702 is equal to or greater than a skin depth to confine electromagnetic radiation within a structure formed by the double-ridge waveguide 700. The metallization thickness (T4) can be the same or less than the metallization thickness (T3) of double-ridge waveguide 600 of FIG. 7.

The double-ridge waveguide 700 also includes a polymer intensifier 707 having a different dielectric property than the polymer material 705. The polymer intensifier 707 can be formed between a first transmission volume 706 and a second transmission volume 708 of the waveguide core 704. The polymer intensifier 707 can be a polymer having a greater dielectric constant at a targeted frequency than the polymer material 705. Alternative, the polymer intensifier 707 can be a ceramic or a composite material. The inclusion of the polymer intensifier 707 can result in a greater field concentration within the waveguide core 704. Properties of the polymer intensifier 707 can be selected to ensure that any bandwidth reduction can accommodate the frequencies selected for the communication channel 206 and radio frequency power transmission 208 of FIG. 3.

Figure 9:
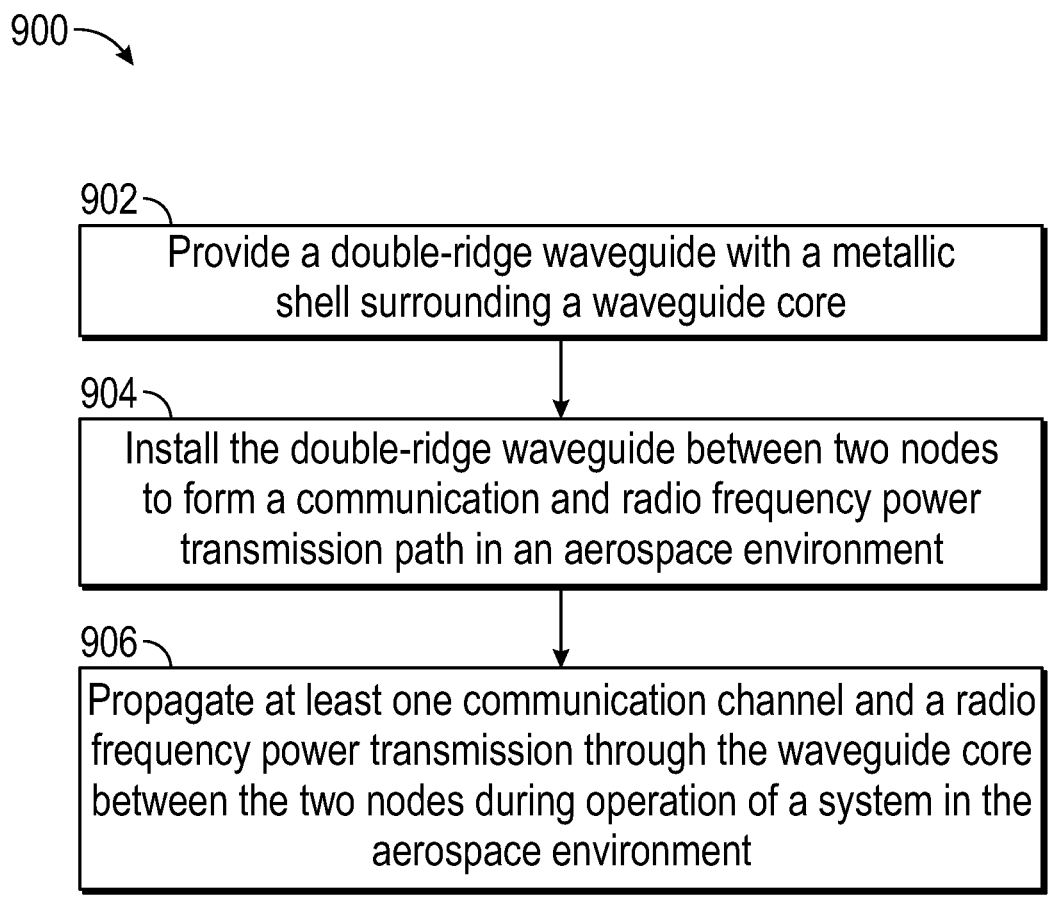
FIG. 9 is a flow chart illustrating a method in accordance with an embodiment of the disclosure.

FIG. 9 is a flow chart illustrating a method 900 of providing a waveguide system for transmitting communication and power in an aerospace environment, such as the gas turbine engine 20 of FIG. 1 in accordance with an embodiment. The method 900 of FIG. 9 is described in reference to FIGS. 1-9 and may be performed with an alternate order and include additional steps.

At block 902, a double-ridge waveguide with a metallic shell surrounding a waveguide core can be provided. Examples include any combination of features of the double-ridge waveguide 300, 400, 500, 600, 700. Each of the double-ridge waveguide 300, 400, 500, 600, 700 can include first and second ridges. Some embodiments can include additional ridges, e.g., a third ridge, a fourth ridge, etc. The double-ridge waveguide can be formed using a metallization process over a core material, such the polymer material 605 or the polymer material 705 with polymer intensifier 707.

At block 904, the double-ridge waveguide can be installed between two nodes, such as nodes 202, 212, to form a communication and radio frequency power transmission path in an aerospace environment. Each end of the double-ridge waveguide may be flush mounted to an interface of nodes 202, 212 such that the waveguide core aligns with a transmitter/receiver interface of the nodes 202, 212. In some embodiments, the first node 202 can be a controller, such as controller 66, and the second node 212 can be configured to interface with at least one sensor 104 or at least one actuator 102 of the gas turbine engine 20.

At block 906, at least one communication channel 206 and a radio frequency power transmission 208 can be propagated through the waveguide between the two nodes 202, 212 during operation of a system in the aerospace environment. For example, node 202 may broadcast commands to node 212 through communication channel 206, and node 212 may respond with status or data. Node 202 can also wirelessly provide power to the node 212 via radio frequency power transmission 208. The double-ridge waveguide configuration can provide a reduced size and weight profile as compared to other waveguide configurations.

The term "about" is intended to include the degree of error associated with measurement of the particular quantity based upon the equipment available at the time of filing the application. For example, "about" can include a range of ±8% or 5%, or 2% of a given value.

The terminology used herein is for the purpose of describing particular embodiments only and is not intended to be limiting of the present disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, element components, and/or groups thereof.

While the present disclosure has been described with reference to an exemplary embodiment or embodiments, it will be understood by those skilled in the art that various changes may be made and equivalents may be substituted for elements thereof without departing from the scope of the present disclosure. In addition, many modifications may be made to adapt a particular situation or material to the teachings of the present disclosure without departing from the essential scope thereof. Therefore, it is intended that the present disclosure not be limited to the particular embodiment disclosed as the best mode contemplated for carrying out this present disclosure, but that the present disclosure will include all embodiments falling within the scope of the claims.

What is claimed is:

1. A waveguide system comprising:
   a first node;
   a second node; and
   a waveguide having first and second ridges, the waveguide comprising a metallic shell surrounding a waveguide core that forms a communication and radio frequency power transmission path in an aerospace environment, wherein the first node is configured to propagate at least one communication channel and a radio frequency power transmission through the waveguide core to the second node during operation of the waveguide system in the aerospace environment, wherein the metallic shell of the waveguide comprises a plurality of ribbed supports distributed along an axis of transmission between a first transmission volume and a second transmission volume of the waveguide core.

2. The waveguide system of claim 1, further comprising a plurality of nodes connected by two or more instances of the waveguide.

3. The waveguide system of claim 1, wherein the waveguide core is sized to propagate the at least one communication channel, and the radio frequency power transmission at a frequency range between 4 Gigahertz and 8 Gigahertz.

4. The waveguide system of claim 1, wherein a metallization thickness of the metallic shell is equal to or greater than a skin depth to confine electromagnetic radiation within a structure formed by the waveguide.

5. The waveguide system of claim 1, wherein the waveguide core comprises a polymer material through which the at least one communication channel and the radio frequency power transmission are propagated.

6. The waveguide system of claim 5, further comprising a polymer intensifier having a different dielectric property than the polymer material, wherein the polymer intensifier is formed between a first transmission volume and a second transmission volume of the waveguide core.

7. A system for a gas turbine engine, the system comprising:
  a first node of the gas turbine engine;
  a second node of the gas turbine engine, wherein the second node is configured to interface with at least one sensor or at least one actuator of the gas turbine engine; and
  a double-ridge waveguide comprising a metallic shell surrounding a waveguide core that forms a communication and radio frequency power transmission path, wherein the first node is configured to propagate at least one communication channel and a radio frequency power transmission through the waveguide core to the second node during operation of the gas turbine engine, wherein the waveguide core within the metallic shell of the double-ridge waveguide comprises a polymer material through which the at least one communication channel and the radio frequency power transmission are propagated.

8. The system of claim 7, further comprising a plurality of nodes connected by two or more instances of the double-ridge waveguide.

9. The system of claim 7, wherein the waveguide core is sized to propagate the at least one communication channel, and the radio frequency power transmission at a frequency range between 4 Gigahertz and 8 Gigahertz.

10. The system of claim 7, wherein the metallic shell comprises a plurality of ribbed supports distributed along an axis of transmission between a first transmission volume and a second transmission volume of the waveguide core.

11. The system of claim 7, wherein a metallization thickness of the metallic shell is equal to or greater than a skin depth to confine electromagnetic radiation within a structure formed by the double-ridge waveguide.

12. The system of claim 7, further comprising a polymer intensifier having a different dielectric property than the polymer material, wherein the polymer intensifier is formed between a first transmission volume and a second transmission volume of the waveguide core.

13. A method comprising:
  providing a double-ridge waveguide with a metallic shell surrounding a waveguide core;
  installing the double-ridge waveguide between two nodes to form a communication and radio frequency power transmission path in an aerospace environment; and
  propagating at least one communication channel and a radio frequency power transmission through the waveguide core between the two nodes during operation of a system in the aerospace environment, wherein the waveguide core within the metallic shell of the double-ridge waveguide comprises a polymer material through which the at least one communication channel and the radio frequency power transmission are propagated between the two nodes.

14. The method of claim 13, wherein the waveguide core is sized to propagate the at least one communication channel and the radio frequency power transmission at a frequency range between 4 Gigahertz and 8 Gigahertz.

15. The method of claim 13, wherein the metallic shell comprises a plurality of ribbed supports distributed along an axis of transmission between a first transmission volume and a second transmission volume of the waveguide core.

16. The method of claim 13, wherein a metallization thickness of the metallic shell is equal to or greater than a skin depth to confine electromagnetic radiation within a structure formed by the double-ridge waveguide.

17. The method of claim 13, wherein further comprising a polymer intensifier having a different dielectric property than the polymer material, wherein the polymer intensifier is formed between a first transmission volume and a second transmission volume of the waveguide core.

* * * * *